United States Patent [19]

Doerr

[11] 4,155,709

[45] May 22, 1979

[54] AQUEOUS OXIDIZING BATH COMPOSITION FOR VAT AND SULFUR DYES AND A PROCESS FOR TREATING REDUCED DYES THEREWITH

[75] Inventor: Richard L. Doerr, Orange, Conn.

[73] Assignee: Olin Corporation, New Haven, Conn.

[21] Appl. No.: 927,314

[22] Filed: Jul. 24, 1978

Related U.S. Application Data

[63] Continuation of Ser. No. 633,239, Nov. 19, 1975, abandoned, which is a continuation-in-part of Ser. No. 468,703, May 10, 1974, Pat. No. 3,944,382.

[51] Int. Cl.² .............................................. C09B 9/00
[52] U.S. Cl. .............................................. 8/34; 8/37;
    8/54.2; 8/76; 8/82
[58] Field of Search ....................... 8/34, 37, 54.2, 76, 8/82

[56] References Cited

U.S. PATENT DOCUMENTS 3,775,047   11/1973   Weston ...................................... 8/37

FOREIGN PATENT DOCUMENTS 657273   9/1951   United Kingdom ....................... 252/34

OTHER PUBLICATIONS

Review of Textile Progress, vol. 14, (1962), The Textile Institute, p. 332.

*Primary Examiner*—William E. Schulz
*Attorney, Agent, or Firm*—Robert J. Feltovic; Thomas P. O'Day

[57] ABSTRACT

A novel composition is described which is an aqueous oxidizing solution containing: (a) about 0.01 to about 10% by weight of an oxidant selected from the water-soluble iodate salts and the water-soluble bromate salts; (b) about 0.005% to about 5% by weight of a water-soluble vanadate salt; and (c) about 0.05 to about 10% of a water-soluble nitrate salt. An improved process for oxidizing vat or sulfur dyes is also described wherein the reduced form of the dye is oxidized by contact with the novel composition.

24 Claims, No Drawings

AQUEOUS OXIDIZING BATH COMPOSITION FOR VAT AND SULFUR DYES AND A PROCESS FOR TREATING REDUCED DYES THEREWITH

This is a continuation, of application Ser. No. 633,239, filed November 19, 1975, now abandoned, which is a continuation-in-part of application Ser. No. 468,703, filed May 10, 1974, now U.S. Pat. No. 3,944,382, by the present inventor.

The present invention relates to the art of dyeing textiles with vat or sulfur dyes. More particularly, the invention relates to novel compositions and to the use of these compositions in an improved process for oxidizing vat or sulfur dyes which are present in reduced form on a fabric or textile in order to develop and improve the color characteristics and fastness and to retard pitting type corrosion of apparatus used in fixing operations. More particularly, the invention involves a novel composition comprising an aqueous solution containing: (a) a water-soluble bromate or iodate salt; (b) a water-soluble vanadate salt; and (c) a water-soluble nitrate and involves the use of the composition in the oxidizing process.

It is conventional practice to apply a vat or sulfur dye to a fabric and thereafter to contact the dye in its reduced or leuco form with a suitable oxidizing agent to fix the same on the fabric. A number of oxidizing agents have been used or suggested in the dyeing art to oxidize and thereby fix vat or sulfur dyes. Of the oxidants hereinafter discussed, only chrome and acid have been widely used on a commercial scale. The traditional oxidizing agent for vat and sulfur dyes is a mixture of sodium dichromate and acetic acid, generally referred to as chrome and acid. The principal disadvantage of using chrome and acid is that it produces heavy metal pollution in effluent streams. Due to increasing governmental control over such effluents, users are forced to clean up such effluent streams or to discontinue the use of chrome and acid entirely. As a result, sodium dichromate is fast losing its preferred position in the dyeing industry.

While chrome and acid treatment generally imparts excellent color characteristics and color fastness to textiles on which it is employed, it does have certain disadvantages other than the pollution problem referred to above. Textiles treated with chrome and acid are generally not easily rewettable and this necessitates the use of wetting agents in subsequent finishing operations. Also residual chrome is difficult to remove from textiles so a soaping treatment is required before processing is completed. To find suitable agents to replace chrome and acid the dyeing industry has turned to halogen containing oxidants. For example, Vincent et al, U.S. Pat. No. 2,382,188, discloses the claims the use of sodium chlorite as an oxidant for vat or sulfur dyes. Sodium chlorite, however, has not gained commercial acceptance primarily because it has been shown that sodium chlorite does not oxidize or fix some vat and many sulfur dyes to a commercially acceptable degree.

U.S. Pat. No. 3,716,325 teaches the use of an aqueous solution of sodium bromite as an oxidant for sulfur dyes. Sodium bromite has met with much wider acceptance than sodium chlorite due to the fact that it is substantially more effective for fixing vat and sulfur dyes than is sodium chlorite. Sodium bromite, however, reacts with cellulose causing undesired consumption of oxidant. Also, sodium bromite can only be used under alkaline conditions which tends to cause bleeding of the dyes.

U.S. Pat. No. 3,775,047 discloses that an aqueous acidic solution of sodium or potassium iodate is suitable as an oxidant for sulfur dyes. However, neither iodates nor bromates are effective for oxidizing all vat and sulfur dyes and this is a serious disadvantage in a commercial dyeing operation. The only other known use of bromates or iodates was disclosed in British Pat. No. 657,273 which relates to a method of paste printing with sulfuric acid esters of leuco vat dyes by the steam development method. A paste containing the sulfuric acid ester of a leuco vat dye, an acid splitter, a bromate, a vanadate and various other ingredients was first applied to a fabric. After application, the fabric was steamed in order to liberate the acid from the ester and liberate the leuco vat dye. As the leuco vat dye was liberated, it was oxidized by the steam and the oxidants present in the paste. This patent teaches paste printing rather than an oxidation with an aqueous oxidant solution and for this reason alone is a commercially unacceptable process.

It is disclosed in copending continuation-in-part patent application Ser. No. 468,703, filed May 10, 1974, by the present inventor, that the efficacy of bromates and iodates is substantially improved by using a vanadate salt in combination with bromates or iodates in an aqueous oxidizing solution. It has now been discovered that the corrosion of fixing operations apparatus may be substantially retarded by the inclusion of a nitrate salt in the aqueous oxidizing solution. In accordance with this discovery an improvement is provided in processes for oxidizing vat or sulfur dyes present in reduced form on cotton or regenerated cellulose textile fibers by the novel process of and with the novel compositions of the present invention.

In accordance with steps generally followed when dyeing with a vat or sulfur dye, a desired shade of dye is applied to a suitable fabric. The dye may be pretreated with a reducing agent prior to application to the fabric or after application but prior to the oxidation step. This reduction step may be accomplished by any known means, for example, by passing the dyed textile through an aqueous solution of an appropriate reducing agent such as sodium hydrosulfite or sodium sulfide. The purpose of the reduction step is to convert the dye to its reduced or leuco form and thereby to completely solubilize the dye in order to maximize penetration into the textile.

Following reduction, the textile is generally subjected to one or more water washings to remove excess dye and unreacted reducing agent. The fabric is then subjected to an oxidation step followed by several further washings, drying, and other desirable finishing steps.

The present invention is directed to an improvement in the oxidation step of the process described generally above. The purpose of the oxidation step is at least twofold. First, oxidation develops the color of the dye since the color of the reduced dye is frequently substantially different than the color of the oxidized dye. Second, complete oxidation is required in order to maximize wash-fastness of the dyed fabric. The effectiveness of the oxidant in the oxidation step is critical in the dyeing process since the final color of the fabric will depend for the most part on the degree of oxidation. By employing a suitable oxidant, costly color adjustments are avoided.

In the present process, as in the prior art, an aqueous solution of an oxidizing agent is employed as the oxidizing bath and the dyed fabric, with the dye in reduced form thereon, is passed through or otherwise contacted by the aqueous solution of oxidizing agent. However, in accordance with the present invention, the aqueous solution of oxidizing agent contains a bromate or iodate oxidant as well as a vanadate salt to function as a catalyst in the oxidation and a nitrate to act as a corrosion inhibitor.

In the compositions of the present invention, the oxidant is a water-soluble bromate or iodate salt and the other two essential components are a water-soluble vanadate salt and a water-soluble nitrate salt. As used throughout this specification, the terms "water-soluble" and "water-soluble salts" refers to both inorganic and organic salts which are soluble, in aqueous oxidizing solutions and include alkaline earth metal salts, alkali metal salts, ammonium salts, and their equivalents, as well as organic salts such as diethanol amine salts and the like. As a matter of economics, the alkaline earth metal salts, the alkali metal salts and ammonium salts are desirable. Preferred are the alkali metal salts and the ammonium salts, especially the sodium, potassium and ammonium salts.

In the process of the present invention, bromates or iodates, utilized as oxidants in an aqueous solution, are used in concentrations of from about 0.01 to about 10% by weight. It is preferred to employ low concentrations within this range in the interest of economy and a concentration of about 0.01 to about 5% by weight is therefore preferable. Further in accordance with the present invention, a vanadate is also employed in the aqueous oxidizing solution. The vanadate salt is preferably employed in smaller amounts than the oxidant and a concentration in the range of about 0.005 to about 5% by weight, preferably about 0.01 to about 2% may be employed. The amount of vanadate may also be based on the amount of oxidant employed if desired and, as so measured, a suitable weight ratio of oxidant to vanadate is from 1:1 to 100:1, preferably 1:1 to 25:1. While larger or smaller ratios may be employed it is generally uneconomical to employ ratios outside these limits.

The mechanism of action of the vanadate salt on oxidizing characteristics of the oxidizing solution as it relates to vat or sulfur dyes is presently not known. Whatever the mechanism, the presence of vanadate in the oxidizing solution potentiates the oxidative effect of the solution on vat or sulfur dyes as shown in the accompanying examples. Strangely, however, this potentiating effect does not substantially increase the oxidative effect of chlorates in a pH range suitable for most dyeing processes. Thus the chlorates remain unsuitable for use at least with the dyes which have been tested. It has also been noted that vanadate does not potentiate the effect of the prior art bromites and chlorites in oxidizing vat or sulfur dyes.

In addition to the selected oxidant bromate or iodate and to the vanadate components, the novel composition of the present invention contain a corrosion inhibiting component in the aqueous solution which is a nitrate. In the solution the nitrate acts as a corrosion inhibitor when used in fixing operations apparatus, e.g., in stainless steel equipment, and is particularly advantageous in inhibiting pitting type corrosion. In general, the amount of nitrate used may be based on the total weight of the aqueous solution and in general about 0.05 to about 10%, preferably about 0.1 to about 5% nitrate, by weight of the solution is used.

In the practice of the present invention, as in the prior art, it is desirable that the oxidizing solution be slightly acidic. The desired degree of acidity is preferably provided by utilizing a suitable amount of acetic acid in the oxidizing bath as is well known in the art. The acetic acid itself, however, has no apparent oxidizing effect as shown in the accompanying examples. Obviously, other weak acids and various mineral acids could be employed as well. It is, however, desirable to avoid excess acidity, since it can damage fabrics. For example, it is not desirable to utilize a pH of less than about 3 nor more than about 6 and a pH of about 3 to about 4 is preferred.

The aqueous oxidizing solution of the present invention may be employed at any desired temperature presently employed by dyers. Suitably temperatures ranging from about 60° F. to about 205° F. or so and preferably about 75° F. to about 200° F. may be employed. With fabrics which are less susceptible to coloration, for example, nylon, acrylics and cellulose acetate, it is preferred to utilize the oxidation solution at a temperature in the upper portion of the preferred range, for example, from about 140° F. to about 200° F.

The process of the present invention may be employed in the fixing of vat or sulfur dyes which are well known to those skilled in the art. For purposes of illustration, however, suitable vat dyes include but are not limited to Vat Orange 15 (C.I. 69025), Vat Green 1 (C.I. 59825), Vat Red 1 (C.I. 73360), Vat Violet 13 (C.I. 68700), Vat Blue 20 (C.I. 59800), Vat Yellow 13 (C.I. 65425). Similarly suitable sulfur dyes include but are not limited to Sulfur Yellow 2 (C.I. 53120), Sulfur Red 10 (C.I. 53228), Sulfur Blue 7 (C.I. 53440), Sulfur Green 2 (C.I. 53571), Sulfur Brown 10 (C.I. 53055), and Sulfur Black 2 (C.I. 53195). Color codes given in parentheses indicate standards for colors set forth in "COLOUR INDEX," second edition, supplement 1963, published by The Society of Dyers and Colourists, Yorkshire, England.

The process and composition of the present invention may be employed in connection with dyeing all textiles which are susceptible of coloration by vat or sulfur dyes. For example, cotton and regenerated cellulose are the principal textile materials on which vat or sulfur dyes are generally used. However, any fabric having cotton or regenerated cellulose in combination with fibers which are not easily dyed with vat or sulfur dyes may be employed if the cotton or regenerated cellulose portion of the fabric constitutes more than a minor portion, for example, more than 20% of the fibers present in the fabric. Cotton/polyester fabrics, for example, usually have about 25 to 50% cotton and may suitably be dyed with vat or sulfur dyes. Certain acrylic fibers, alone or in combination with cotton or regenerated cellulose may also be dyed with vat or sulfur dyes, for example, Chemstrand's Acrilon ® and Dow's Zephran ®. Finally, nylon or combinations thereof with other susceptible fibers may be dyed with these dyes. It is, therefore, preferred to utilize textiles of cotton or regenerated cellulose or combinations of fibers wherein cotton or regenerated cellulose is more than a minor constituent of the textile.

The process of the present invention is applicable to dyeing the above-identified fibers or fiber combinations regardless of form. For example, yarns, woven or nonwoven fabrics may all be employed in accordance with the present invention. The present invention may be employed equally well with various methods for dyeing. It is recommended for use in package dyeing, continuous dyeing and in jig batch dyeing procedures. It may be necessary in package dyeing, however, to adjust the concentration of oxidant upwardly from the preferred minimums but no other adjustments are generally required.

When practiced in accordance with the principles set forth above, the present process provides the dyer with an oxidant for vat and sulfur dyes that has unexpectedly improved oxidizing characteristics, is inexpensive and is effective with vat or sulfur dyes which were difficult to oxidize to an acceptable degree with iodates or bromates alone and corrosion of fixing operations apparatus is substantially retarded.

Having thus fully described the present invention, the following examples will illustrate the practice and advantages thereof. In these examples, SODYESUL Liquid Brown 7RCF is employed as a dye on which to demonstrate the effect of vanadate in the oxidizing bath. It is one of the dyes which causes difficulty with bromites, chlorites, bromates, and iodates, and undergoes a definite color change during oxidation which makes it easy to determine the degree of oxidation by visual examination and/or reflectance readings. Examples 1 to 35 illustrate the fixing process and Examples 36 to 47 show the advantageous corrosion inhibition achieved.

EXAMPLE 1

A dye formulation containing 90g/l SODYESUL Liquid Brown 7RCF, Southern Dyestuff Co., Division Martin Marietta Corporation, (Sulfur Red 10, C.I. 53228) and 30g/l SODYEFIDE B sodium sulfide solution (also Southern Dyestuff Co.) is prepared and applied to a sample of finely woven 100% cotton twill fabric using a laboratory padder. The fabric is steamed for one minute and then rinsed in warm water to remove excess dye and wrung out to remove excess water. The fabric is then dipped twice in an aqueous oxidizing solution containing 7.5g/l sodium dichromate and 7.5g/l acetic acid, rinsed and ironed dry. Oxidation appears essentially complete after 2 dips by visual observation. Reflectance of the resulting dyed fabric is measured (after 10 dips) and adjusted to a reading of $50\pm5$ on a scale of 1–100 as a standard for the following examples.

EXAMPLE 2

Example 1 is repeated except that 1.5g/l $NaNO_3$ is included in the aqueous oxidizing solution and reflectance is found to be identical to the standard, establishing that the nitrate salt has no detrimental effect on the reflectance properties obtained.

EXAMPLE 3

Example 1 is repeated utilizing an aqueous oxidizing solution comprising 0.45g/l sodium bromate, 0.1g/l sodium vanadate and 7.5g/l acetic acid. After 3 to 4 dips oxidation consistently appears complete. A reflectance reading of $53\pm5$ is obtained after 10 dips confirming the visual observation.

EXAMPLE 4

Example 3 is repeated except that 1.5g/l $NaNO_3$ is included in the aqueous oxidizing solution. Reflectance of $55\pm5$ is found, confirming visual observation of complete oxidation.

EXAMPLES 5 and 6

Example 3 is twice repeated with ammonium vanadate substituted for sodium vanadate once with and once without $NaNO_3$ (1.5g/l) present in the oxidizing solution for Examples 5 and 6 respectively. Oxidation is again complete after 3 to 4 dips and this is confirmed after 10 dips by reflectance readings of $52\pm5$ and $53\pm2$ for Examples 5 and 6 respectively.

EXAMPLES 7 and 8

Example 1 is repeated using an aqueous oxidizing agent comprising 0.45g/l sodium chlorate and 7.5g/l acetic acid, with and without 1.5g/l $NaNO_3$ for Examples 7 and 8 respectively. After 10 dips oxidation is incomplete in both Examples. Reflectance readings of 100+ are obtained for both Examples, confirming visual observations.

EXAMPLES 9 and 10

Example 1 is repeated utilizing an aqueous oxidizing solution comprising 0.45g/l sodium chlorate, 0.1g/l sodium vanadate and 7.5g/l acetic acid, with and without 1.5g/l $NaNO_3$ for Examples 9 and 10 respectively. After 7 dips little, if any, oxidation appears to have taken place. Reflectance readings of 98 and 100+ are obtained after 10 dips confirming this visual observation for both Examples 9 and 10.

EXAMPLES 11 and 12

Example 1 is repeated utilizing an oxidizing solution comprising 0.45g/l sodium iodate and 7.5g/l acetic acid, with and without 1.5g/l $NaNO_3$ for Examples 11 and 12 respectively. After 10 dips oxidation is only partially complete in both Examples. Reflectance readings of 90 and 85 are obtained for Examples 11 and 12 respectively, confirming the visual observations.

EXAMPLES 13 and 14

Example 1 is repeated using an aqueous oxidizing solution comprising 0.45g/l sodium iodate, 0.1g/l sodium vanadate and 7.5g/l acetic acid, with and without 1.5g/l of $NaNO_3$ for these two Examples. After 5 to 6 dips oxidation appears substantially complete in both cases. Reflectance readings of 77 and 74 are obtained after 10 dips confirming visual observations.

EXAMPLES 15 Through 35

Example 1 is repeated using aqueous oxidizing solutions containing 7.5g/l of acetic acid and other components as shown in Table I, for Examples 15 through 35. The corresponding reflectance readings obtained according to the procedure set forth in Example 1 are given in Table I as follows:

Table I

| | Oxidizing Solution | | | Oxidation Results | |
|---|---|---|---|---|---|
| Example | 0.45 g/l Bromate | 0.04 g/l Vanadate | 1.5 g/l Nitrate | Number of Dips | Reflectance |
| 15 | Na | $NH_4$ | Mg | 2–3 | 58 |
| 16 | Na | Ca | Na | 3–4 | 57 |
| 17 | Na | Ca | Mg | 3–4 | 57 |
| 18 | Na | Mg | Na | 2–3 | 54 |
| 19 | Na | Mg | Mg | 3–4 | 59 |
| 20 | Ca | Na | Mg | 3–4 | 58 |
| 21 | Ca | Na | Mg | 3–4 | 58 |
| 22 | Ca | $NH_4$ | Na | 3–4 | 57 |
| 23 | Ca | $NH_4$ | Mg | 3–4 | 58 |
| 24 | Ca | Ca | Na | 3–4 | 58 |
| 25 | Ca | Ca | Mg | 3–4 | 58 |

Table I-continued

| | Oxidizing Solution | | | Oxidation Results | |
| --- | --- | --- | --- | --- | --- |
| Example | 0.45 g/l Bromate | 0.04 g/l Vanadate | 1.5 g/l Nitrate | Number of Dips | Reflectance |
| 26 | Ca | Mg | Na | 3-4 | 57 |
| 27 | Ca | Mg | Mg | 3-4 | 57 |
| 28 | Mg | Na | Na | 3-4 | 54 |
| 29 | Mg | Na | Mg | 3-4 | 57 |
| 30 | Mg | NH4 | Na | 3-4 | 60 |
| 31 | Mg | NH4 | Mg | 3-4 | 60 |
| 32 | Mg | Ca | Na | 4-5 | 58 |
| 33 | Mg | Ca | Mg | 4-5 | 54 |
| 34 | Mg | Mg | Na | 3-4 | 57 |
| 35 | Mg | Mg | Mg | 3-4 | 58 |

EXAMPLE 36

An aqueous solution is prepared containing 6% by weight NaBrO3 (oxidant), 12% by weight NaCl (corrosive component), 0.5% by weight NaVO3 with no nitrate present. This oxidant-containing solution is subsequently combined with glacial acetic acid and water to form a dye oxidation formulation containing 8 grams per liter of the oxidant-containing solution and 8 grams per liter of the acid. The formulation is tested for corrosion properties as discussed below.

EXAMPLES 37 through 41

Example 36 is repeated except that about 5%, 10%, 15%, 20%, and 25% NaNO3 is added to the oxidant-containing solution prior to formulation for Examples 37 through 41 respectively.

EXAMPLES 42 Through 47

Examples 36 through 41 are repeated for Examples 42 through 47 respectively except that formulations containing 32 grams per liter of the oxidant-containing solution and 32 grams per liter of the acid are used.

The above formulations of Examples 36 through 47 are tested as follows: coupons of S.S. 304 and S.S. 316 (stainless steel) fixing operations apparatus material are totally immersed in each formulation at about 140° F. and observed for signs of corrosion on a macroscopic level. The time interval at which visual appearance of corrosion occurs is noted and the coupons are removed after 60 minutes. The following Table II shows the results of the test, and illustrates the corrosion inhibiting character of the presence of nitrate in the system:

Table II

| Formulation Example | Time Before Visual Appearance of Corrosion | |
| --- | --- | --- |
| | S.S. 304 | S.S. 316 |
| | (min.) | (min.) |
| 36 | 10 | 15 |
| 37 | 10 | 10 |
| 38 | 10 | 15 |
| 39 | none (60 min.) | none (60 min.) |
| 40 | none (60 min.) | none (60 min.) |
| 41 | none (60 min.) | none (60 min.) |
| 42 | 15 | 15 |
| 43 | 15 | 20 |
| 44 | 25 | none (60 min.) |
| 45 | none (60 min.) | none (60 min.) |
| 46 | none (60 min.) | none (60 min.) |
| 47 | none (60 min.) | none (60 min.) |

What is claimed is:

1. An aqueous bath composition for oxidizing reduced vat and sulfur dyes, consisting essentially of a water-based solution containing: (a) about 0.01 to about 10% by weight of an oxidant selected from water-soluble iodate salts and water-soluble bromate salts; (b) about 0.005% to about 5% by weight of a water-soluble vanadate salt; and (c) about 0.05 to about 10% by weight of a water-soluble nitrate salt.

2. The composition of claim 1 wherein said water-soluble salts are selected from alkaline earth metal salts, alkali metal salts, and ammonium salts.

3. The composition of claim 1 wherein said water-soluble salts are selected from alkali metal salts and ammonium salts.

4. The composition of claim 3 wherein said oxidant is selected from sodium, potassium and ammonium iodate or bromate.

5. The composition of claim 4 wherein said nitrate salt is selected from sodium, potassium and ammonium nitrate.

6. The composition of claim 5 wherein said vanadate salt is selected from sodium, potassium and ammonium vanadate.

7. The composition of claim 1 wherein said aqueous solution contains: (a) about 0.01 to about 5% by weight of said oxidant; (b) about 0.01 to about 2% by weight of said vanadate salt; and (c) about 0.1 to about 5% by weight of said nitrate salt.

8. The composition of claim 7 wherein said water-soluble salts are selected from alkaline earth metal salts, alkali metal salts, and ammonium salts.

9. The composition of claim 7 wherein said water-soluble salts are selected from alkali metal salts and ammonium salts.

10. The composition of claim 9 wherein said oxidant is selected from sodium, potassium and ammonium iodate or bromate.

11. The composition of claim 10 wherein said nitrate salt is selected from sodium, potassium and ammonium nitrate.

12. The composition of claim 11 wherein said vanadate salt is selected from sodium, potassium and ammonium vanadate.

13. In a process for oxidizing vat or sulfur dyes present in reduced form on cotton or regenerated cellulose textile fibers, by contacting said dyes, at a temperature of about 60°-205° F., with a slightly acidic oxidizing composition; the improvement wherein said composition comprises: an aqueous solution containing: (a) about 0.01 to about 10% by weight of an oxidant selected from water-soluble iodate salts and water-soluble bromate salts; (b) about 0.005% to about 5% by weight of a water-soluble vanadate salt; and (c) about 0.05 to about 10% by weight of a water-soluble nitrate salt.

14. The process of claim 13 wherein said water-soluble salts are selected from alkaline earth metal salts, alkali metal salts, and ammonium salts.

15. The process of claim 13 wherein said water-soluble salts are selected from alkali metal salts and ammonium salts.

16. The process of claim 15 wherein said oxidant is selected from sodium, potassium and ammonium iodate or bromate.

17. The process of claim 16 wherein said nitrate salt is selected from sodium, potassium and ammonium nitrate.

18. The process of claim 17 wherein said vanadate salt is selected from sodium, potassium and ammonium vanadate.

19. The process of claim 13 wherein said aqueous solution contains: (a) about 0.01 to about 5% by weight of said oxidant; (b) about 0.01 to about 2% by weight of said vanadate salt; and (c) about 0.1 to about 5% by weight of said nitrate salt.

20. The process of claim 19 wherein said water-soluble salts are selected from alkaline earth metal salts, alkali metal salts, and ammonium salts.

21. The process of claim 19 wherein said water-soluble salts are selected from alkali metal salts and ammonium salts.

22. The process of claim 21 wherein said oxidant is selected from sodium, potassium and ammonium iodate or bromate.

23. The process of claim 22 wherein said nitrate salt is selected from sodium, potassium and ammonium nitrate.

24. The process of claim 23 wherein said vanadate salt is selected from sodium, potassium and ammonium vanadate.